United States Patent [19]

Laurie

[11] 4,229,400

[45] Oct. 21, 1980

[54] MOLD COMPONENT COMPRISING A MAT IMPREGNATED WITH A REACTION PRODUCT OF AN AMINOPLAST RESIN AND A POLYALKYLENE GLYCOL

[75] Inventor: William A. Laurie, Winona, Minn.

[73] Assignee: Fiberite Corporation, Winona, Minn.

[21] Appl. No.: 943,133

[22] Filed: Sep. 18, 1978

[51] Int. Cl.² .......................... B29C 1/02; B32B 27/42; B41D 3/00

[52] U.S. Cl. ........................................ 264/225; 101/12; 101/17; 101/401.2; 249/134; 264/220; 428/268; 428/273; 428/278; 428/290; 428/908; 427/389.7; 427/389.8

[58] Field of Search .............. 428/268, 273, 278, 290, 428/908; 101/12, 17; 264/220, 227, 225; 101/401.2; 427/385 A, 390 A; 249/134

[56] References Cited

U.S. PATENT DOCUMENTS

| | | | |
|---|---|---|---|
| 2,075,636 | 5/1937 | Browne | 249/134 |
| 2,509,499 | 5/1950 | Higgins | 428/908 |
| 2,703,051 | 3/1955 | Richardson | 101/17 |
| 3,075,260 | 1/1963 | Stanczak | 101/17 |
| 3,114,174 | 12/1963 | Kunetka | 249/134 |
| 4,137,363 | 1/1979 | Maron et al. | 101/12 |

*Primary Examiner*—James C. Cannon
*Attorney, Agent, or Firm*—Richard J. Renk

[57] ABSTRACT

A shapeable matrix is provided for use in making of graphic art reproductions and in particular as a mold in forming of printing plates and other marking items.

19 Claims, 4 Drawing Figures

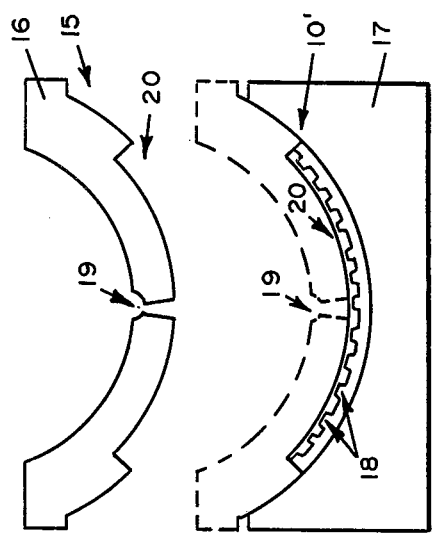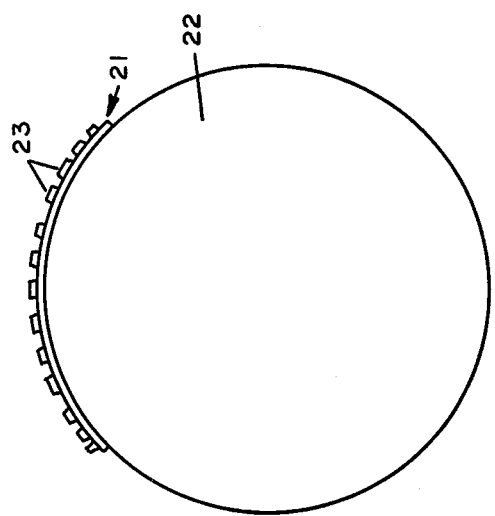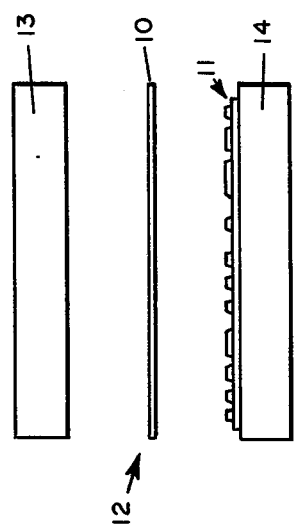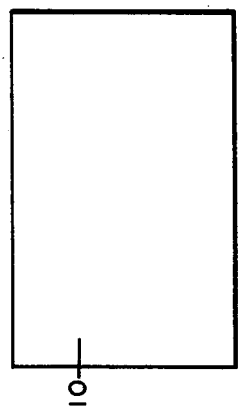

MOLD COMPONENT COMPRISING A MAT IMPREGNATED WITH A REACTION PRODUCT OF AN AMINOPLAST RESIN AND A POLYALKYLENE GLYCOL

BACKGROUND OF INVENTION

1. Field of Use

While the invention is not limited to any particular field it has specific utility in the production of printing plates, pattern plates and other marking and shaping items.

2. Description of Prior Art

In the newspaper industry, for many years printing plates have been made of lead formed against a matrix of wood pulp, clay and water.

Recently, to expedite printing plate duplication, plastic printing plates have been tried on a limited scale in place of the lead plates. In one process, a magnesium metal master or pattern plate is prepared by a photographic and etching process. A negative (or matrix) is then formed by pressing a plastic against the metal to form a reproduction (negative) of the master plate. The plastic matrix is then used to produce a number of "positive" copies for the actual printing function when multiple press operation is employed. The copies ("positives") are formed by molding or pressing thermoplastics or rubber elastomers against the "negative" matrix.

In another process, instead of the metal "master" an organic plastic "master" or pattern plate is made using a liquid polyester polymer which is cured by transmitting ultra-violet light through a photographic negative or transparency of the printed format. In the areas struck by the ultra-violet light, the resin is hardened. In the areas "screened" from the ultra-violet light, the resin remains liquid and is washed away by an aqueous developing solution or air knife blast.

The polyester master or "positive" is then used as described above as a substitute for the metal master to make a "negative" matrix which in turn can be used to produce multiple "positive" copies. The copies are then used as the actual printing plates. (A process using the polyester concept is sold by Hercules Incorporated, Wilmington, Del. under the trademark "Merigraph".)

However, the above prior processes have inherent deficiencies as the matrix plates (negative plates) have been susceptible to taking a compression-set on repeated uses. As a result, the printing plate copies or duplicates made from the negative matrix have letters of different heights. The printed copy is thus blurry, smudged, and hard to read. Certain areas might have too much ink and others too little.

One conventional matrix concept uses a non-dense core of an asbestos-cellulose composition which has a phenolic resin coating. However, when a moldable material such as polypropylene is molded against the matrix, the core gradually flows and compresses in thickness providing uneven print characters. Moreover, the phenolic resin of the matrix is susceptible to flex-cracking and peeling from the core material.

Other problems have been inherent with the prior phenolic-type matrix plates. When formed against the organic polyester "masters", the pressures required to form the phenolic "negative" matrix have caused the print or characters on the organic polyester to collapse. The phenolics also have a strong tendency to stick and bond to the polyester. In addition, the phenolic matrix plates cannot be bent easily to the curved surface of a mold platen (having substantially the same diameter as a printing press cylinder) without cracking.

SUMMARY OF INVENTION

The present invention overcomes the deficiencies of the prior art by providing a matrix which can be used against either metal or plastic masters to receive very sharply defined impressions. The imprinted material then serves as a mold against which a plastic material is molded to form multiple "positive" duplicates for use as the actual printing plates. For this purpose, the matrix must be capable of becoming dense when cured so that it will not take a compression-set when hot molten plastics under pressure are molded against it; it must be flexible so that it can be shaped to take the contour of a printing press drum or cylinder without cracking; it must have good release properties from other plastics, particularly the polyesters, without bonding, sticking or distorting; it must be porous during its initial forming to allow for the expulsion of air and gases; it must be capable of being molded against a "master" (such as the polyesters) under relatively low temperatures and pressures so as not to cause the images and characters of the master to collapse and flow laterally; and it must be able to withstand other plastics being molded against it, such as the polypropylenes without taking lateral and vertical flow compression-set. The present invention accomplishes the foregoing by means of a novel matrix which includes the reaction product of an aminoplast and a polymeric ether selected from the group consisting of polyethylene glycol and polypropylene glycol.

DESCRIPTION OF DRAWINGS

FIG. 1 is a plan view showing a matrix in sheet form prior to shaping or molding.

FIG. 2 is an exploded side view showing the matrix of FIG. 1 being placed between molding platens for forming against a "master" ("positive") printing plate.

FIG. 3 shows the matrix, after forming in FIG. 2, bent or deflected to a cylindrical curvature and used as a part of a mold against which a plastic material can be injected in the making of multiple "positive" printing plate copies.

FIG. 4 shows a "positive" duplicate printing plate after molding to the curvature in FIG. 3 mounted on a printing press cylinder.

DESCRIPTION OF INVENTION

While the invention has many applications, it will be specifically described with reference to its application in the forming of printing plates and similar articles.

As shown in FIG. 2, a matrix sheet 10 of the invention is shaped or formed under heat and pressure against a "master" ("positive") printing plate 11 mounted in a molding press shown generally at 12. The press is shown schematically to have a top platen 13 and a lower platen 14.

The master ("positive") printing plate 11 is used as a pattern and may be of metal such as magnesium or of plastic such as polyester. The sheet 10, which contains a moldable resin (as will be described in detail later) is then formed or molded by closing of the platens 13 and 14. Shaping is done at pressures of 20 to 200 psi and preferably in the range of 50 to 200 psi at temperatures generally between 225° F. to 370° F. depending on the material of the master 11.

After curing, the "molded" negative matrix (shown at 10' in FIG. 3) may then be bent or curved to approximate the curvature of a printing press cylinder and inserted in an injection molding press shown schematically at 15 (FIG. 3) having a top platen 16 and a bottom platen 17. In this view, the molded matrix negative 10' is shown curved and cradled in the bottom platen 17 with the imprinted image 18 thereon on the concave or upper side of the bend. The top platen 16 is then moved into clamping engagement relative to the bottom platen 17 as shown by the dotted line position.

After the top platen 16 is moved into the dotted-line position, a duplicate "positive" printing plate may be made by molding a plastic material against the curved negative matrix 10'. As shown in FIG. 3, polypropylene or the like may be injected through the sprue opening 19 into a relief cavity 20 in the top platen 16 overlying the molded matrix 10' to make a duplicate "positive" printing plate 21 (FIG. 4). The duplicate printing plate 21 upon molding has the curvature of the mold base 17 so as to substantially match the curvature of a printing cylinder 22. As will be noted in FIG. 4, the duplicate plate 21 has its printing images or characters 23 on the convex side of the plate and thereby correspond with those of the master plate 11.

Now in accordance with the invention, in order to provide multiple "positive" copies or duplicates without showing any creep or compressive deformation under successive moldings, the formed matrix 10' must be dense and homogeneous. In prior concepts, the matrix would compress and successive positive duplicates would vary in thickness. This resulted in uneven printing effects because of the variation in the relief depth of the print characters.

To accomplish these requisites, in its broadest aspect, the present invention includes the reaction of the components of an aminoplast system with a polymeric ether selected from the group consisting of polethylene glycol (ethylene oxide polymers) and polypropylene glycol, using approximately 7 to 20 parts by weight of the aminoplast to 1 part by weight of the polymeric ether, with a preferred range being 9 to 13 parts of the aminoplast to one part of the polymeric ether. As is well known, the aminoplasts are synthetic resins of the thermosetting type which are prepared by reacting an organic compound containing an amino group with an aldehyde or ketone. Typical of the amino group are urea, thiourea, cylic ethylene urea, dicyandiamide, melamine, and alkyl and aryl melamines.

The molecular weight of the polymeric ether selected from the group consisting of polyethylene glycol and polypropylene glycol can vary between 50,000 to 4,000,000. However where lower molding pressures are required, a molecular weight range of about 100,000 to 400,000 produces optimum flexibility and release with good compression-set resistance.

Polyethylene glycols such as the "Polyox" water-soluble resins which are non-ionic poly (ethylene oxide) homopolymers made by Union Carbide having an approximate molecular weight from about 100,000 ("Polyox" WSR-N-10) to 200,000 ("Polyox" WSR-N-80) have worked well.

As for the preparation, the aminoplast-polymeric ether product can be prepared with conventional equipment. A typical sequence involves mixing a constituent from the amino group and an aldehyde or ketone, adjusting the pH of the mixture in the range of about 7.5 to 9 and refluxing until a drop of the mixture hydrophobes (precipitates) in an excess of water at approximately 0° C. The polymeric ether is then added and the reaction continued at reflux or at a suitable reaction temperature generally between 180° F. to 220° F. for a suitable length of time. The product may then be cured to an insoluble infusible form by heating at temperatures in the general range of 225° F. to 390° F.

As an ideal matrix, the sheet 10 may be made by applying the aminoplast-polyethylene glycol polypropylene glycol resin (combined with suitable well known fillers and lubricants as will be described later) to a non-woven or semi-porous carrier such as a glass fiber net. The mat may then be handled easily and contain a predetermined amount of resin.

After the mat is cured in a mold 12 (FIG. 2), a matrix 10' is formed which is flexible and plant and enables it to be bent or shaped for use as a mold insert 10'. In addition to being resilient and pliant, the matrix 10' in accordance with the invention has superior release properties from polypropylene and other printing plate materials which are molded against it. This is extremely important for print fidelity and definition since slight bonding or sticking to the matrix 10' can cause the print character to smudge or blurr.

In this context, for many newspaper printing operations the ability to produce many "positive" plate copies is extremely important because of the number of presses required to run the same format concurrently to meet high volume circulation requirements. The present invention thus provides a means of quickly making duplicate printing plates (positives) economically out of thermoplastics such as polypropylene and the like which may be recycled by regrinding and remelting after they are used.

Typical examples of the invention for purposes of illustration only and not for purposes of limitation follow.

EXAMPLE I

Mix 126 parts by weight melamine with 200 parts of Formalin (37% CH20-Formaldehyde) and adjust the pH of the mixture to between 8 and 9. Heat the mixture containing this pH at reflux until a drop of the mixture hydrophobes (precipitates) in an excess of water at 0° C. At this point, 20 parts by weight of Polyox WSRN-80 Union Carbide poly (ethylene oxide) having a molecular weight of approximately 200,000 are added and reaction continued for 40 minutes at approximately 200° F. The reaction is then dehydrated, preferably with a vacuum, to produce a white fusible partially water soluble resin product.

From this product, 35 parts by weight thereof are mixed with five parts of Carbowax (as a hot melt processing aid), one part of Zinc stearate (lubricant), one part of pigment for color and 51 parts of Wollastonite filler (calcium silicate) and five parts of water are added as a processing aid. The resin-filler mixture is then applied by hot melt processing to a glass mat so as to result in non-cured matrix prepreg of 90 percent resin mixture by weight and 10 percent glass mat. The resulting matrix is then utilized to make a plastic "negative" printing plate by molding and curing at 305 degrees F. and 100 psi against a magnesium or polyester master or positive plate.

The resultant matrix negative produced by pressing and curing the above melamine-polyethylene glycol matrix prepreg against the polyester master plate showed exceptional release qualities from the polyester and excellent flexibility. The molded matrix negative plate was then utilized as a mold insert in an injection molding machine against which molten polypropylene was injected to produce duplicate positive printing plates.

EXAMPLE II

The steps and components of Example I were repeated with the exception of Union Carbide's Polyox "WSRN-10", poly(ethylene) oxide, having a molecular weight of approximately 100,000 was used.

The resultant melamine-polyethylene glycol matrix prepreg was utilized in the same manner and produced excellent duplicate printing plates when polypropylene was injection molded against it.

EXAMPLE III

One hundred twenty parts of urea and 325 parts of 37 percent Formalin were reacted at reflux for 30 minutes at pH 7. At this point, 20 parts of Polyox (WSRN-80) were added and heating continued for 30 minutes. The product was then dehydrated to a fusible powder then mixed with 50 parts of silica filler, one part of glycerol monostearate lubricant, five parts Carbowax, one part of pigment and four parts water. The mixture was then applied to a glass mat carrier in the ratio of 85 parts of resin mixture to 15 parts of glass to produce a matrix prepreg. The urea-polyethylene glycol matrix was utilized to make a plastic negative printing plate by molding against a merigraph polyester positive master at 150 psi and 300 degrees F. The resultant matrix showed good release and good flexibility when molded and cured in this manner. In subsequent utilization the matrix was used as an insert in an injection mold against which polypropylene was molded to produce printing plates for multiple newspaper page printing.

EXAMPLE IV 126 parts by weight of melamine were reacted with 200 parts of Formalin (37 percent formaldehyde) and the pH of the mixture adjusted to between 8 and 9. The mixture was heated maintaining the pH at a reflux until a drop of the mixture hydrophobed (precipitates in an excess of 0 degrees C. water.) At this point, five parts by weight of Polyox "WSRN-80" was added and the reaction continued for 40 minutes at reflux. The reaction is then dehydrated, preferably with vacuum, to produce a white fusible partially soluble product. From this dehydrated product 35 parts by weight are mixed with five parts of Carbowax (as a hot melt processing aid), one part zinc stearate (lubricant), one part of pigment for color and 51 parts Wollastonite filler (calcium silicate) and five parts of water as a processing aid. This resin filler mixture was then applied by hot melt processing to a glass mat so it results in a non-cured matrix prepreg of 90 percent resin mixture by weight and ten percent glass mat. The resultant mixture was then used to make a plastic negative "printing plate" by molding and curing at 325 degrees and 150 psi against a polyester "master" or "positive" plate. This matrix was generally unsatisfactory for the production of duplicate positive printing plates as cracking occurred when the cured matrix was bent to the appropriate 15 inch diameter to be used for a printing press mold insert (against which it was desired to mold polypropylene duplicate printing plates).

EXAMPLE V 125 parts by weight of melamine were mixed with 200 parts of Formalin (37 percent formaldehyde) and the pH of the mixture adjusted to 8 to 9. Heat the mixture containing this pH at reflux until a drop of mixture hydrophobes (precipitates) in an excess of water at 0 degree C. At this time, 40 parts by weight of Polyox WSRN-80, Union Carbide trademark for poly(ethylene oxide) are added and the reaction continued for 40 minutes between 180° F. and 220° F. The reaction is then dehydrated, preferably with vacuum, to produce a white fusible partially water soluble product. This product, (35 parts by weight thereof), are mixed with five parts of Carbowax as a hot melt processing aid, one part of zinc stearate lubricant, one part of pigment for color and 51 parts of Wollastonite filler (calcium silicate) and five parts of water as a processing aid. This resin filler mixture is then applied by hot melt processing to a glass mat to give a non-cured matrix prepreg of 85 percent resin mixture by weight and 15 percent glass mat. The resultant matrix was then utilized to make a plastic negative printing plate by molding and curing at 325 degrees F. and 100 psi against a magnesium or polyester master positive plate. When used as a mold insert, the resultant matrix negative printing plate was generally unsatisfactory as it showed high compressive-set characteristics when utilized to mold against polypropylene. The letters of the matrix compressed to different heights when polypropylene positive printing plates were molded against it thereby providing uneven or blurred printed copies. Also, because of excessive flow, the surface of the cured matrix contained many air bubbles or voids in the surface which collapsed and caused defects when a polypropylene positive printing plate was molded against the matrix. These voids also are sites for polypropylene getting into the matrix and causing breakage of the matrix when the mold opens.

EXAMPLES VI thru X

The Examples I thru V were repeated with the exception of the polyethylene glycols being replaced with polypropylene glycols of the equivalent molecular weights; the end results were substantially the same.

While, the invention has been described in conjunction with the use of a glass fiber mat, other forms of mats can be used such as those with the common vegetable and mineral fibers. Likewise, while Wollastonite is used as a filler, others can be used as can other lubricants and hot melt processing aids which are well known. Also, while the cured matrix has been described in conjunction with its use as a "negative" to form duplicate positive plates, the cured and formed mat may be used directly as a "positive" printing plate for some applications.

What I claim is:
1. The method for making printing plates comprising,
    forming a carrier containing a reactive resin comprising the reaction product of an aminoplast and a resin selected from the group consisting of polyethylene glycol and polypropylene glycol under heat and pressure against a master printing plate so as to produce a cured negative of said master printing plate,
    inserting said cured negative into a molding device so as to provide a mold insert therein, and flowing a plastic material against said molded negative insert and curing said plastic to produce a copy of said master printing plate.

2. A method of making printing plates as claimed in claim 1, wherein said master printing plate includes a polyester resin.

3. A method of making printing plates as claimed in claim 1 wherein said master printing plate is magnesium.

4. A method of making printing plates as claimed in claim 1, wherein a thermoplastic material is flowed against said molded negative insert.

5. A method of making printing plates as claimed in claim 1, wherein polypropylene is flowed against said molded negative.

6. A negative printing plate against which a plastic material may be molded under heat and pressure to produce a positive printing plate comprising a reaction product of an aminoplast and a resin selected from the group consisting of polyethylene glycol and polypropylene glycol in a cured condition on a carrier therefor.

7. A mold component comprising,
a relatively hard plastic sheet having a substantially homogeneous dense structure with formed areas thereon,
said mold having been somewhat porous during its forming to permit gases to escape therethrough and having a relatively hard surface after forming such that the formed areas thereon will take minimal compressive-set upon the molding thereagainst of a plastic material under heat and pressure,
said mold component including the reaction product of aminoplast and a resin selected from the group of polyethylene glycol and polypropylene glycol.

8. A printing plate matrix capable of being shaped under heat and pressure and then being used as a part of a mold for imparting a portion of its shape to a plastic material under heat and pressure comprising,
a carrier having a porous characteristic, and
a curable resin carried by said carrier capable of receiving very sharply defined impressions upon molding and being cured, said surface being able to be used as a mold against which another plastic material may be shaped,
said resin including a reaction product of the components of an aminoplast resin and resin selected from the group consisting of polyethylene glycol and polypropylene glycol.

9. A printing plate matrix as claimed in claim 8 wherein said aminoplast is derived from an amino compound taken from the group consisting of urea, thiourea, cyclic ethylene urea, dicyandiamide, melamine and alkyl and aryl melamines.

10. A printing plate matrix as claimed in claim 8 wherein from 7 parts to 20 parts by weight of said aminoplast to 1 part by weight of said resin selected from the group consisting of said polyethylene glycol and said polypropylene glycol are used in making said resin.

11. A printing plate matrix as claimed in claim 8 wherein from 9 to 13 parts by weight of said aminoplast to 1 part by weight of the resin of said group are used.

12. A printing plate matrix as claimed in claim 8 wherein the resin from said group has a molecular weight in the range of 50,000 to 4,000,000.

13. A printing plate matrix as claimed in claim 8 wherein the resin from said group has a molecular weight in the range of 100,000 to 400,000.

14. The printing plate matrix as claimed in claim 8 wherein said aminoplast is melamine formaldehyde.

15. A printing plate matrix as claimed in claim 8 wherein said carrier is a permeable glass fiber mat.

16. The shaped mold resulting from curing the printing plate matrix as claimed in claim 8 against a polyester material.

17. A printing plate matrix as claimed in claim 8 wherein the resin from said group has a molecular weight in the range of 100,000 to 200,000.

18. A mold that can be bent to at least an approximate 15 inch diameter of a printing press cylinder resulting from curing the matrix as claimed in claim 17 in a relatively flat condition.

19. The method of making a molded carrier comprising,
reacting the components of an aminoplast resin with a resin selected from the group consisting of polethylene glycol and polypropylene glycol to produce a reaction product,
applying the reaction product by hot melt processing to a somewhat porous carrier and allowing the hot melt to cool, and
pressing said carrier coated with said reaction product against a mold surface and curing under heat and pressure to produce a hard but somewhat flexible molded carrier.

* * * * *